United States Patent
Heise et al.

(10) Patent No.: US 7,388,885 B2
(45) Date of Patent: Jun. 17, 2008

(54) SPLITTER CIRCUIT

(75) Inventors: Bernd Heise, München (DE); Heinrich Schenk, München (DE); Christian Wolff, Miesbach (DE)

(73) Assignee: Infineon Technologies AG, Munich (DE)

( * ) Notice: Subject to any disclaimer, the term of this patent is extended or adjusted under 35 U.S.C. 154(b) by 365 days.

(21) Appl. No.: 10/493,345

(22) PCT Filed: Sep. 25, 2002

(86) PCT No.: PCT/EP02/10760

§ 371 (c)(1),
(2), (4) Date: Apr. 22, 2004

(87) PCT Pub. No.: WO03/037031

PCT Pub. Date: May 1, 2003

(65) Prior Publication Data

US 2004/0251986 A1 Dec. 16, 2004

(30) Foreign Application Priority Data

Oct. 22, 2001 (DE) .............................. 101 51 949

(51) Int. Cl.
*H04J 1/00* (2006.01)
(52) U.S. Cl. .................... 370/480; 379/93.09
(58) Field of Classification Search ............ 379/93.09; 370/497, 493–495
See application file for complete search history.

(56) References Cited

U.S. PATENT DOCUMENTS 5,528,630 A * 6/1996 Ashley et al. .............. 375/258
5,623,543 A * 4/1997 Cook .......................... 379/402

(Continued)

FOREIGN PATENT DOCUMENTS

DE    199 33 485 A1    1/2001

(Continued)

OTHER PUBLICATIONS

Cook, John and Phil Sheppard, "ADSL and VADSL Splitter Design and Telephony Performance", IEEE Journal on Selected Areas in Communications, vol. 13, No. 9, © Dec. 1995, (9 pages).

*Primary Examiner*—Ramnandan Singh
(74) *Attorney, Agent, or Firm*—Maginot, Moore & Beck

(57) ABSTRACT

A splitter circuit (19) serves to combine on the transmission side signals which are to be transmitted in different frequency bands (A-C), as well as to separate on the reception side these signals which are transmitted in different frequency bands. For this purpose, the splitter circuit (19) has a circuit section (13) designed as purely passive, for the rough signal and impedance separation, as well as the filters (3, 4; 9, 10) allocated to the individual transmission and reception sections, for the exact filtering out of the individual signal in each case. These separate filters (3, 4; 9, 10) are arranged in the transmission direction upstream of a corresponding four-wire/two-wire conversion, and in the reception direction downstream of a corresponding two-wire/four-wire conversion, so that the signal stream takes place via these filters in one direction only, and the filters can be designed as purely active filters or digital filters. In particular, the filters (3, 4; 9, 10) can be dimensioned as of high Ohmic resistance in the reception path, in order to reduce the power consumption.

10 Claims, 3 Drawing Sheets

U.S. PATENT DOCUMENTS

| | | | | |
|---|---|---|---|---|
| 5,627,501 | A | * | 5/1997 | Biran et al. ................. 333/17.1 |
| 5,757,803 | A | * | 5/1998 | Russell et al. ............... 370/494 |
| 5,889,856 | A | * | 3/1999 | O'Toole et al. ........ 379/399.02 |
| 5,930,340 | A | | 7/1999 | Bell |
| 6,026,160 | A | | 2/2000 | Staber et al. |
| 2001/0026607 | A1 | | 10/2001 | Scholtz et al. |

FOREIGN PATENT DOCUMENTS

| | | |
|---|---|---|
| EP | WO 99/65217 A1 * | 12/1999 |
| WO | WO 99/65217 * | 12/1999 |
| WO | WO 00/48314 | 8/2000 |
| WO | WO 00/70833 | 11/2000 |

* cited by examiner

SPLITTER CIRCUIT

FIELD OF THE INVENTION

The present invention relates to a circuit arrangement for the separation of signals to be transmitted in different frequency bands over a transmission route, and, respectively, for the combination of signals that are to be transmitted in different frequency bands over a transmission route, which is usually also designated as a splitter.

BACKGROUND

Splitters are used, for example, in connection with telephone lines over which, in addition to the conventional speech channel or ISDN signal ("Integrated Services Digital Network"), a high-rate digital signal is transmitted, such as an ADSL or VDSL signal ("Asymmetric Digital Subscriber Line" or "Very High Bit Rate Digital Subscriber Line"). The splitter thereby has the object of combining on the transmission side the two signals which are to be transmitted in different frequency bands for common transmission over the telephone line, and separating them again on the reception side, whereby in particular transmission takes place simultaneously over the telephone line in both directions.

FIG. 3 represents, by way of example, the use of a splitter in an ISDN/ADSL transmission system. In this context, FIG. 3 represents two subscribers who are in communication via bidirectional telephone lines 18 with an exchange 20. It is assumed from this that the upper subscriber has only an ISDN connection, and accordingly an ISDN transmitter 1 and an ISDN receiver 11 are allocated to him. The upper subscriber can therefore connect a suitable ISDN peripheral device directly to the telephone line 18, which has been connected to the corresponding ISDN connection of the exchange 20. An ISDN transmitter 1 and an ISDN receiver 11 are also allocated to the ISDN connection of the exchange 20. The lower subscriber, by contrast, has both an ISDN connection with an ISDN transmitter 1 and an ISDN receiver 11, and an ISDN connection 18 to an ADSL transmitter 2 and an ADSL receiver 12. In order for the ISDN signal and the ADSL signal to be combined for a joint transmission over the telephone line 18 on the transmission side, and in order for them to be separated again on the reception side, the use of a splitter 19 is necessary both at the subscriber and at the exchange 20.

FIG. 4 shows a diagrammatic representation of frequency bands, such as are found in an ISDN/ADSL transmission system of the type shown in FIG. 3. The frequency band of the ISDN signal is designated by A. For the ADSL transmission system, non-overlapping frequency bands are assumed, i.e. it is assumed that frequency band B in the upstream transmission direction (from the subscriber to the exchange) and the frequency band C in the downstream transmission direction (from the exchange to the subscriber) do not overlap. The frequency spectra of the ISDN signals, by contrast, are located in the same frequency band A for upstream and downstream transmission directions.

FIG. 5 represents, by way of example, a splitter 19 in accordance with the prior art, in a transmission system with a two-wire line 18, in which transmission takes place in both directions, i.e. bidirectional. The separation of the outgoing and return channel is effected with the aid of hybrid circuits 5, 6, which are also designated as a two-wire/four-wire or four-wire/two-wire conversion respectively. The hybrid circuits 5, 6 are coupled to the splitter 19 by means of transmitters 16, 17, whereby the hybrid circuit 5 is allocated to an ISDN circuit with an ISDN transmitter 1 and an ISDN receiver 11, while the hybrid circuit 6 is allocated to an ADSL connection with an ADSL transmitter 2 and an ADSL receiver 12.

The ISDN and ADSL signals received via the bidirectional transmission line 18 from the splitter 19 in different frequency bands are separated from one another, whereby the ISDN signal is conducted via the hybrid circuit 5 to the ISDN receiver 11. The ADSL signal is conducted via the hybrid circuit 6 to the ADSL receiver 12. Conversely, the splitter 19 also serves to combine the signals from the ISDN transmitter 1 via the hybrid circuit 5 and from the ADSL transmitter 2 respectively via the hybrid circuit 6 and to transmit them in the different frequency bands via the transmission line 18 to a corresponding receiver arrangement which can be designed, for example, as analogous to the circuit arrangement shown in FIG. 5.

To combine and separate the ISDN and ADSL signals respectively, the splitter 19 usually comprises suitable high-pass and low-pass structures. With the example shown in FIG. 5, the splitter represents in particular a purely passive circuit arrangement in the form of a three-gate array, which must be dimensioned in such a way that, on the one hand, the different systems do not incur mutual interference and, on the other, the impedance conditions are not too substantially altered. This represents a relatively large expenditure of effort, since because of the frequency bands being, as a rule, located close to one another, filters with steep damping flanks are required, and only purely passive components (resistors, inductors, and capacitors) can be used for the realisation of the arrangement.

SUMMARY

The present invention is based on the object of proposing a circuit arrangement for the separation of signals transferred in different frequency bands via a transmission route and/or for the combining of signals to be sent in different frequency bands via a transmission route, i.e. a splitter circuit arrangement, with which the purely passive filter technique described heretofore is replaced by an arrangement which allows for a partially digital or actively integrated solution.

According to the invention, the circuit arrangement required for the signal separation is provided not in the form of a three-gate array at the end of the transmission route in each case but is divided onto different part systems. For rough signal and impedance separation, a purely passive circuit section is provided, coupled to the individual transmission route. For the final signal separation, further filters are provided, which are provided between the individual receiver and the purely passive circuit section described heretofore, and which filters out precisely the signal which is desired in each case.

In the case of a bidirectional signal transfer, these filters are arranged in each case between the corresponding receiver and the corresponding hybrid circuit, which has the advantage that with these filters the signal flow takes place in one direction only, so that an active filter or even a digital filter can be used.

Heretofore the invention has been described briefly for the case of the signal separation of signals transmitted in different frequency bands, in order for these to be conducted to corresponding receivers, which can, for example, be allocated to a subscriber of the transmission system in each case. Naturally, the circuit arrangement described heretofore can also be used for the reverse transmission direction, i.e. for the combining of signals which are to be transferred jointly in different frequency bands via a transmission route. In this situation, the separate filters explained heretofore are preferably located in the individual signal path upstream of the transmission amplifier which, as a rule, is always present. This has the advantage that, with an active filter realisation, the filters can be dimensioned in the individual transmission part with high Ohmic resistance, and the power consumption thereby reduced. The filters in the reception path can also be dimensioned as of high Ohmic resistance, because the individual hybrid circuit undertakes a decoupling effect.

Because with the splitter circuit arrangement according to the invention the filters provided separately from the circuit section designed as purely passive can be realised as of high Ohmic resistance and active, or also as purely digital in conjunction with corresponding digital/analog or analog/digital converters, a solution with the aid of an integrated circuit is possible. In addition to this, with a digital solution, the output and input filters respectively which in most cases are present in any event can be modified and adapted accordingly, so that a substantial reduction of the overall expenditure and effort for realisation can be achieved.

The present invention is preferably suitable for the combining and/or separation of speech signals and digital signals which are to be transmitted in different frequency bands or have been transmitted in different frequency bands, such as, for example, ISDN and ADSL/VDSL signals. Naturally, the present invention is not restricted to this preferred scope of application, however, but can be used in general in all transmission systems in which two or more signals are intended to be transmitted together in different frequency bands via one transmission route.

The present invention is described hereinafter in greater detail by reference to the appended drawings, on the basis of a preferred embodiment.

DETAILED DESCRIPTION

Figure 1:
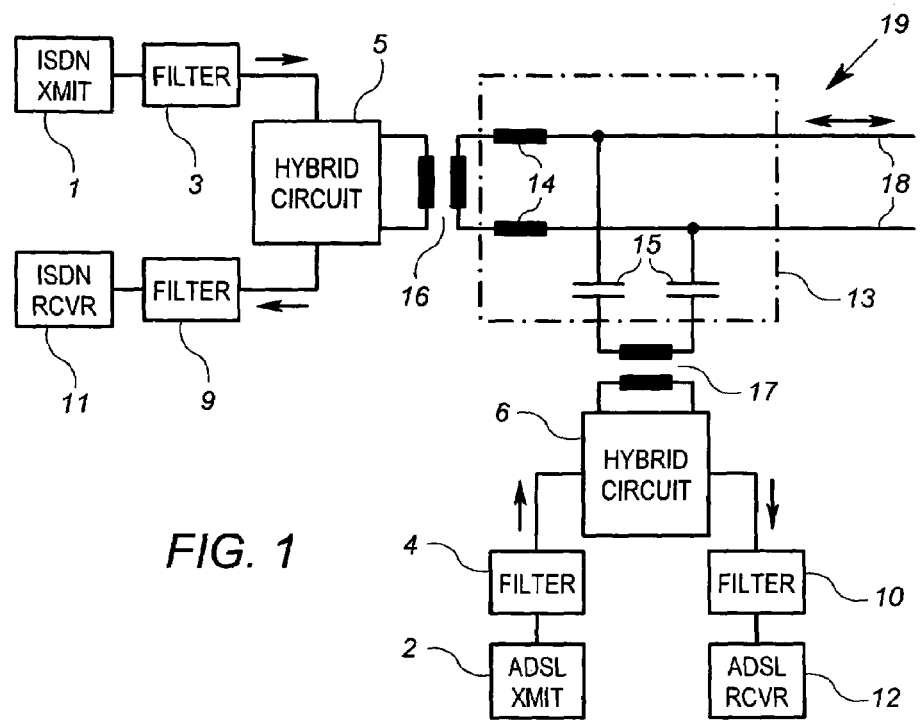
FIG. 1 shows a splitter circuit arrangement according to a preferred embodiment of the present invention.

The splitter circuit arrangement 19 shown in FIG. 1 is explained hereinafter for the situation of an ISDN/ADSL transmission system.

Figure 4:
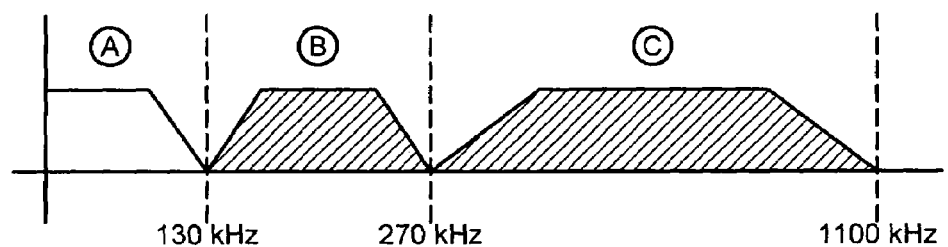
FIG. 4 shows a schematic representation of the frequency ranges with an ISDN/ADSL transmission path system.

The splitter circuit arrangement 19 comprises a circuit section 13 composed exclusively of passive circuit components, which is coupled to a (bidirectional) two-wire transmission line 18. ISDN and ADSL signals are transmitted together in different frequency bands via this transfer line (see the representation in FIG. 4).

Figure 5:
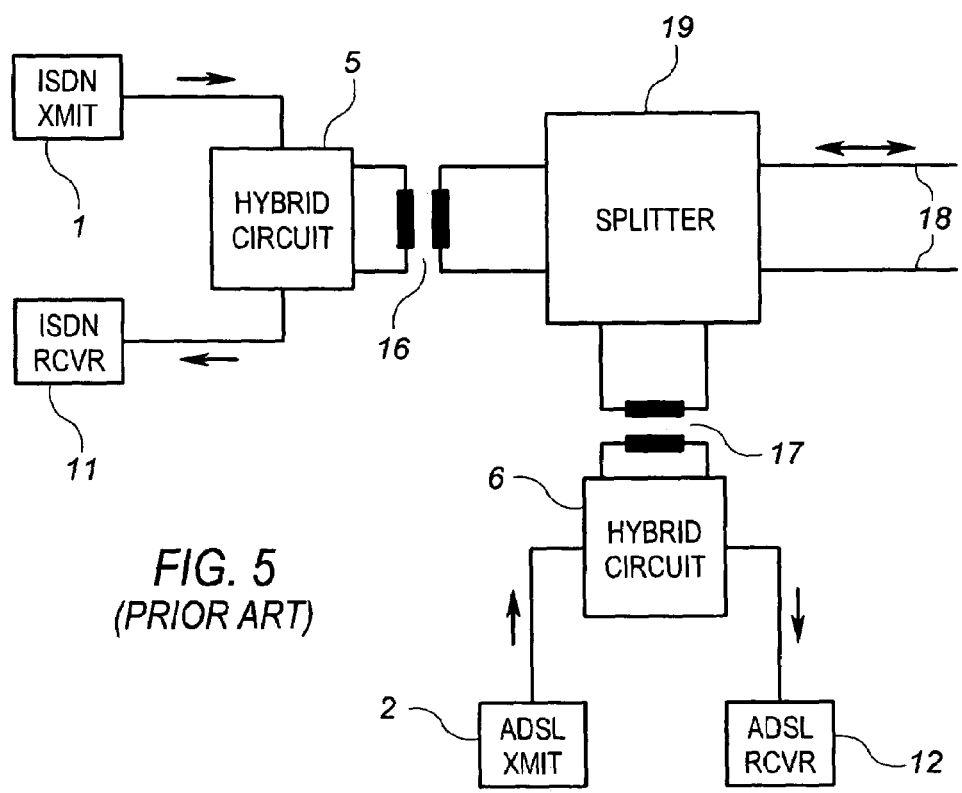
FIG. 5 shows a splitter circuit arrangement in accordance with the prior art.

The circuit section 13 serves for the rough signal and impedance separation and can therefore be designated as a simplified splitter. For the rough filtering out of an ISDN signal transmitted via the transmission line 18, inductors 14 are provided, while for filtering out an ADSL signal capacitors 15 are provided. As with the example shown in FIG. 5, the ISDN signal which is roughly filtered out or roughly separated is conducted via a transformer 16 and a hybrid circuit 5 to an ISDN receiver 11 of a subscriber ISDN connection. In an analogous manner, the roughly-separated ADSL signal is conducted via a transformer 17 and a hybrid circuit 6 to an ADSL receiver 12 of a subscriber ADSL connection.

In the receiver paths filters 9, 10 are provided for the final or fine or exact signal separation or signal filtering, which are arranged between the hybrid circuit 5, 6 in each case and the receiver 11, 12 in each case. This has the advantage that the signal stream takes place through the filters 9, 10 in one direction only, so that purely active filters or digital filters can be used as the filters 9, 10. With the example mentioned heretofore of an ISDN receiver 11 and of an ADSL receiver 12, with the location shown in FIG. 4 and described heretofore of the corresponding frequency bands, the filter 9 is, in particular, a low-pass filter, and the filter 10 is a high-pass filter.

For the joint transmission of the ISDN and ADSL signals present in different frequency bands, filters 3 and 4 respectively are accordingly also provided in the transmission paths of the ISDN connection and the ADSL connection, whereby the filter 3, by analogy with the filter 9, is a low-pass filter, and the filter 4, by analogy with the filter 10, is a high-pass filter. An ISDN signal generated by an ISDN transmitter 1 of the ISDN connection is conducted via the filter 3 to the hybrid circuit 5, and coupled via the transformer 16 and the circuit section 13, arranged as purely passive, into the transmission line 18. Conversely, an ADSL signal generated by an ADSL receiver 2 of the ADSL connection is conducted via the filter 4 to the hybrid circuit 6 and via the transformer 17 and the circuit section 13 designed as purely passive into the transmission line 18, in order to be transmitted together with the ISDN signal to a corresponding receiver arrangement. In this situation, in the circuit section 13 the ISDN signal is coupled into the transmission line 18 via the inductors 14, already explained heretofore, while the ADSL signal is coupled in via the capacitors 15. The hybrid circuits 5, 6, serve in each case for the four-wire/two-wire conversion or two-wire/four-wire conversion between the four-wire ISDN connection or four-wire ADSL connection respectively and the two-wire transmission line 18.

Figure 2:
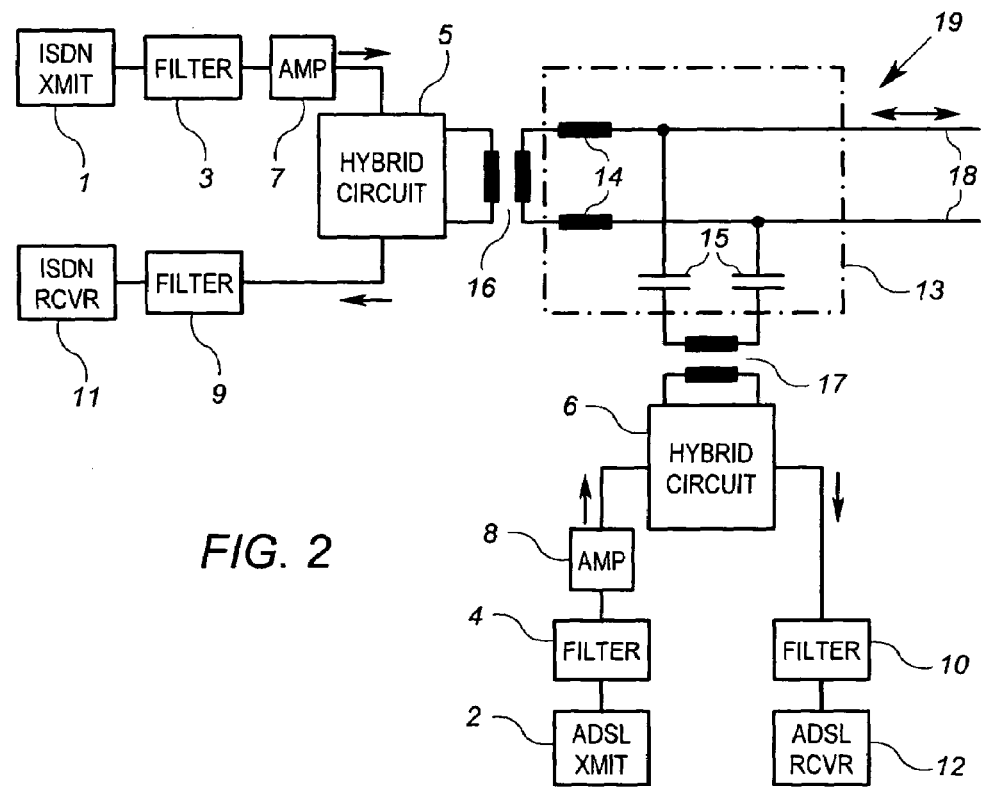
FIG. 2 shows a derivation of the splitter circuit arrangement shown in FIG. 1.
Figure 3:
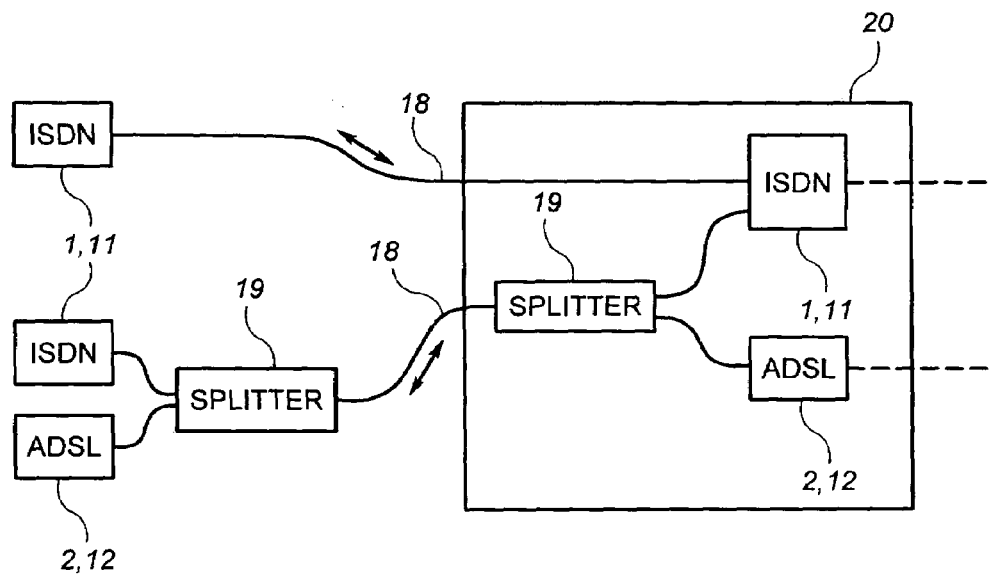
FIG. 3 shows a representation for explaining the use of splitter circuit arrangements in an ISDN/ADSL transmission system.

Usually provided in each case in the signal paths of the ISDN connection and the ADSL connection is a transmission amplifier 7 or 8 respectively. Advantageously, in this situation the filtering carried out by the filters 3, 4, takes place in the transmission path upstream of the transmission amplifier 7, 8, in each case, which has the advantage that, with an active filter realisation, the filters 3, 4, can be dimensioned as of high Ohmic resistance in the transmission part, and therefore the power consumption can be reduced. A corresponding embodiment is shown in FIG. 2.

The filters 9, 10, in the reception path in each case can therefore be dimensioned as of high Ohmic resistance, since the corresponding hybrid circuit 5, 6 undertakes a decoupling process.

The invention claimed is:

1. An apparatus for the separation of signals transmitted in different frequency bands via a transmission route comprising:
    a splitter circuit consisting essentially of passive circuit components and coupled to the transmission route, the splitter circuit configured to carry out an inexact separation of first and second signals transmitted in a first and second frequency band respectively, a first receiver, and a second receiver, a first filter coupled to receive the inexactly separated first signal from the splitter circuit, the first filter configured to more exactly separate the first signal from the second signal, and conduct the first signal to the first receiver, and a second filter coupled to receive the inexactly separated second signal from the splitter circuit, the second filter configured to more exactly separate the second signal from the first signal, and conduct the second signal to the second receiver.

2. The apparatus of claim 1, wherein:

the first frequency band lies in a lower frequency range than a frequency range of the second frequency band; and the splitter circuit includes inductors coupled to the transmission route configured to provide inexact separation of the first signal and capacitors coupled to the transmission route configured to provide inexact separation of the second signal.

3. The apparatus of claim 1, wherein each of the first and second filters comprises an active filter.

4. The apparatus of claim 1, wherein each of the first and second filters comprises a digital filter.

5. The apparatus of claim 1, further comprising:

a first hybrid circuit arranged between the splitter circuit and the first filter; a second hybrid circuit arranged between the splitter circuit and the second filter;

a first transmitter;

a second transmitter; and wherein the transmission route comprises a bidirectional transmission line, the first hybrid circuit is connected to the first transmitter and the second hybrid circuit is connected to the second transmitter, and a first signal generated by the first transmitter is conducted in the first frequency band via the first hybrid circuit to the splitter circuit and a second signal generated by the second transmitter is conducted via the second hybrid circuit to the splitter circuit for transmission together via the transmission route.

6. The apparatus of claim 5, further comprising:

a third filter, corresponding to the first filter, arranged between the first transmitter and the first hybrid circuit; and a fourth filter, corresponding to the second filter, arranged between the second transmitter and the second hybrid circuit.

7. The apparatus of claim 6, further comprising a first transmission amplifier allocated to the first transmitter and a second transmission amplifier allocated to the second transmitter, and wherein the third filter is arranged in the direction of transmission upstream of the first transmission amplifier and the fourth filter is arranged in the direction of transmission upstream of the second transmission amplifier.

8. The apparatus of claim 1, wherein the apparatus comprises an integrated circuit.

9. The apparatus of claim 1, further comprising:

a first isolation device operably coupled to provide isolation between the splitter circuit and the first filter; and a second isolation device operably coupled to provide isolation between the splitter circuit and the second filter.

10. The apparatus of claim 1, further comprising:

a first hybrid circuit coupled between the splitter circuit and the first filter; and a second hybrid circuit coupled between the splitter circuit and the second filter.

* * * * *